US012669195B2

(12) United States Patent     (10) Patent No.:   US 12,669,195 B2
Wang et al.         (45) Date of Patent:    Jun. 30, 2026

(54) INTER-PIPE FIXING MEMBER, EVAPORATOR, AND REFRIGERATOR

(71) Applicants: HEFEI HAIER REFRIGERATOR CO., LTD, Hefei (CN); QINGDAO HAIER REFRIGERATOR CO., LTD., Qingdao (CN); HAIER SMART HOME CO., LTD., Qingdao (CN)

(72) Inventors: Haijuan Wang, Qingdao (CN); Wenjing Cai, Qingdao (CN); Yanbin Wan, Qingdao (CN); Wenchao Xue, Qingdao (CN)

(73) Assignees: HEFEI HAIER REFRIGERATOR CO., LTD, Hefei (CN); QINGDAO HAIER REFRIGERATOR CO., LTD., Qingdao (CN); HAIER SMART HOME CO. LTD., Qingdao (CN)

( * ) Notice: Subject to any disclaimer, the term of this patent is extended or adjusted under 35 U.S.C. 154(b) by 118 days.

(21) Appl. No.: 18/290,701

(22) PCT Filed: May 12, 2022

(86) PCT No.: PCT/CN2022/092478
    § 371 (c)(1),
    (2) Date: Jan. 19, 2024

(87) PCT Pub. No.: WO2023/005346
    PCT Pub. Date: Feb. 2, 2023

(65) Prior Publication Data
    US 2025/0092965 A1     Mar. 20, 2025

(30) Foreign Application Priority Data
    Jul. 26, 2021    (CN) .......................... 202121705667.3

(51) Int. Cl.
    *F16L 3/22*      (2006.01)
    *F25B 39/00*     (2006.01)
    *F25B 39/02*     (2006.01)

(52) U.S. Cl.
    CPC ................ *F16L 3/22* (2013.01); *F25B 39/00* (2013.01); *F25B 39/02* (2013.01)

(58) Field of Classification Search
    CPC . F16L 3/22; F16L 3/1075; F16L 3/223; F16L 3/2235; F25B 39/00; F25B 39/02; F25B 41/40; F25B 41/37; F25D 23/006
    See application file for complete search history.

(56) References Cited

U.S. PATENT DOCUMENTS

| | | | |
|---|---|---|---|
| 4,163,372 A | 8/1979 | Frye et al. | |
| 4,408,467 A | 10/1983 | Murnane et al. | |
| 2005/0247827 A1 | 11/2005 | Moher | |

FOREIGN PATENT DOCUMENTS

| | | |
|---|---|---|
| AU | 2016200271 A1 | 2/2016 |
| CN | 101432582 A | 5/2009 |

(Continued)

*Primary Examiner* — Frantz F Jules
*Assistant Examiner* — Emmanuel E. Duke
(74) *Attorney, Agent, or Firm* — MUNCY, GEISSLER, OLDS & LOWE, P.C.

(57) ABSTRACT

An inter-pipe fixing member, an evaporator and a refrigerator. The inter-pipe fixing member includes a fixing portion, which is provided with at least two fixing grooves, wherein each fixing groove is configured to be adapted to a pipeline, and the at least two fixing grooves are adapted to different pipelines, and/or the at least two fixing grooves are adapted to different sections of the same pipeline. The inter-pipe fixing member realizes fixing between different pipelines and/or different sections of the same pipeline, and when the inter-pipe fixing member is applied to the evaporator, it can be ensured that the pipelines of the evaporator are kept at a certain distance, thereby avoiding collisions.

7 Claims, 4 Drawing Sheets

(56)  References Cited

FOREIGN PATENT DOCUMENTS

| | | | | | |
|---|---|---|---|---|---|
| CN | 203273032 | U | * | 11/2013 | |
| CN | 101821563 | B | * | 3/2014 | ............. F25B 39/00 |
| CN | 103672174 | A | * | 3/2014 | ............ F16L 3/1222 |
| CN | 204254053 | U | * | 4/2015 | ............ F16L 3/2235 |
| CN | 204612322 | U | | 9/2015 | |
| CN | 108204479 | A | * | 6/2018 | ............. H02G 3/02 |
| CN | 207989893 | U | * | 10/2018 | |
| CN | 109732265 | A | * | 5/2019 | |
| CN | 110925495 | A | * | 3/2020 | ............. F16L 3/223 |
| CN | 210320535 | U | * | 4/2020 | |
| CN | 111089199 | A | * | 5/2020 | ............. H02G 3/32 |
| CN | 211372618 | U | | 8/2020 | |
| CN | 112283453 | A | * | 1/2021 | ............. F16L 3/123 |
| CN | 113819306 | A | * | 12/2021 | ............... F16L 3/22 |
| CN | 215260656 | U | * | 12/2021 | |
| CN | 113944820 | A | | 1/2022 | |
| CN | 215763666 | U | | 2/2022 | |
| CN | 216114849 | U | | 3/2022 | |
| FR | 2915263 | A1 | * | 10/2008 | ............. F24F 13/00 |

* cited by examiner

INTER-PIPE FIXING MEMBER, EVAPORATOR, AND REFRIGERATOR

TECHNICAL FIELD

The present invention relates to the field of refrigeration and freezing devices, and in particular, to an inter-pipe fixing member, an evaporator, and a refrigerator.

BACKGROUND

The existing evaporator inter-pipe fixing members mostly utilize gaps between evaporator pipes, leading to displacement and detachment during the transportation and use of the refrigerator, thus failing to fulfill their intended function. Additionally, the material of the current inter-pipe fixing members is prone to cracking. Furthermore, in the refrigeration cycle of the refrigerator, as the refrigerant enters the inlet of the evaporator, the liquid-phase refrigerant starts to vaporize, causing flash evaporation. The vigorous gas-liquid flow tends to generate bubbles, and the bursting of these bubbles causes fluid turbulence. Along with the periodic compression and exhaust of the refrigeration system, pulsating fluid can occur. The discontinuous turbulent two-phase flow impacts the refrigeration pipeline, creating eddy current noise or eruption sound, which significantly affects the user experience due to the loud noise from the evaporator.

SUMMARY

An object of the present invention is to provide an inter-pipe fixing member that can conveniently and stably fix pipelines of an evaporator.

A further object of the present invention is to reduce the vibration and noise during the operation of the evaporator.

In particular, the present invention is directed to an inter-pipe fixing member, comprising:

a fixing portion defining at least two fixing grooves, wherein the fixing grooves are configured to adapt to pipelines, and the at least two fixing grooves are adapted to different pipelines, and/or the at least two fixing grooves are adapted to different sections of the same pipeline.

Further, the inter-pipe fixing member is an integrally formed flexible structure, or at least partially a flexible structure.

Further, the inter-pipe fixing member further comprising:

a moving part, movably connected to the fixing portion; and an insertion part, connecting with the moving part and movably connected to the fixing portion, such that the pipeline inserted into the fixing groove, and pulling the insertion part brings the moving part closer to the fixing portion to secure the inter-pipe fixing member with the pipeline.

Further, the fixing portion is provided with an insertion port, into which the insertion part is inserted; a part of the insertion part protruding out of the insertion port is further provided with an insertion protrusion.

Further, the fixing portion comprises a first fixing section and a second fixing section; the second fixing section extends forward from a lower rear side of the first fixing section; the fixing grooves are defined on the first fixing section, the second fixing section, or at an intersection between the first and second fixing sections.

Further, a front wall of the first fixing section is provided with at least two fixing grooves opening upwards and forwards at intervals along a vertical direction; an upper wall of the second fixing section is provided with a fixing groove opening backwards and upwards; the intersection between the first and second fixing sections is provided with a fixing groove opening upwards and forwards.

Further, the moving part above the fixing groove on the front wall of the first fixing section is formed with a docking protrusion, ensuring that when the moving part fits against the fixing portion, the docking protrusion cooperates inside the fixing groove.

The present invention is further directed to an evaporator, comprising:

an evaporator body, with its coiled pipeline having a refrigerant inlet and a refrigerant outlet;

a connecting pipeline defined between a capillary tube and the refrigerant inlet; and the inter-pipe fixing member connected with the connecting pipeline via the fixing grooves, to reduce the noise caused by pipelines resonance during the operation of the evaporator.

Further, the refrigerant outlet is connected to an outlet pipeline; the connecting pipeline comprises a first pipeline, a second pipeline, and an inlet pipeline connected in sequence, the inlet pipeline is connected to the refrigerant inlet, and an inner diameter of the first pipeline is larger than that of the second pipeline; the inter-pipe fixing member is connected with at least two of the first pipeline, second pipeline, inlet pipeline, and outlet pipeline via at least two fixing grooves, and the pipelines fit with the fixing grooves in an interference fit.

The present invention is further directed to a refrigerator having the evaporator.

The inter-pipe fixing member according to the present invention defines the fixing portion with at least two fixing grooves, and the at least two fixing grooves are adapted to different pipelines, and/or the at least two fixing grooves are adapted to different sections of the same pipeline, to ensure the fixation of different pipelines and/or different sections of the same pipeline, thereby maintaining a certain distance between the pipelines of the evaporator and preventing collisions.

Further, the inter-pipe fixing member according to the present invention defines the fixing portion, the moving part and the insertion part, and the inter-pipe fixing member itself adopts a similar zip-tie fastening manner, so that the pipelines are not easy to fall off, the fastness and stability of the pipelines installation can be ensured and the structure of the whole inter-pipe fixing member is simple, thus it's easy to be processed and molded, and easy to be assembled with the pipelines.

Further, the invention's evaporator defines the inter-pipe fixing member, and the inter-pipe fixing member connects at least two of the first pipeline, second pipeline, inlet pipeline, and outlet pipeline via at least two fixing grooves, thereby effectively reducing noise caused by pipelines resonance during operation.

The above and other objects, advantages and features of the present invention will become more apparent to those skilled in the art from the following detailed description of specific embodiments thereof taken in conjunction with the accompanying drawings.

BRIEF DESCRIPTION OF THE DRAWINGS

Some specific embodiments of the invention will be described in detail hereinafter by way of example and not by way of limitation with reference to the accompanying drawings. The same reference numerals identify the same or similar components or parts in the drawings. Those skilled in the art should appreciate that the drawings are not necessarily drawn to scale. In the drawings.

DETAILED DESCRIPTION

Figure 1:
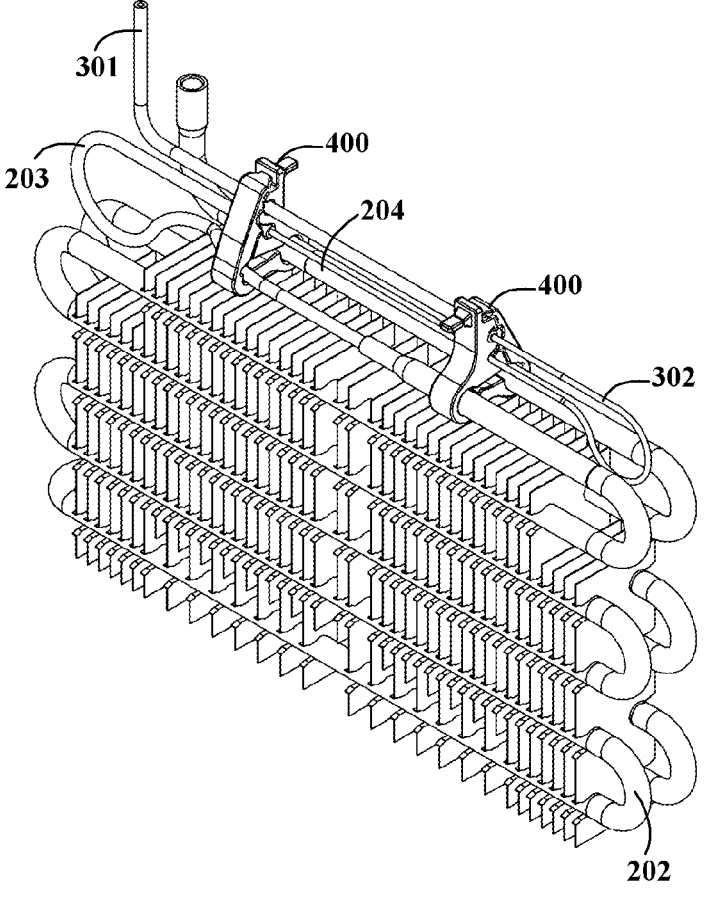
FIG. 1 is a schematic structural diagram of an evaporator with an inter-pipe fixing member according to an embodiment of the present invention.
Figure 2:
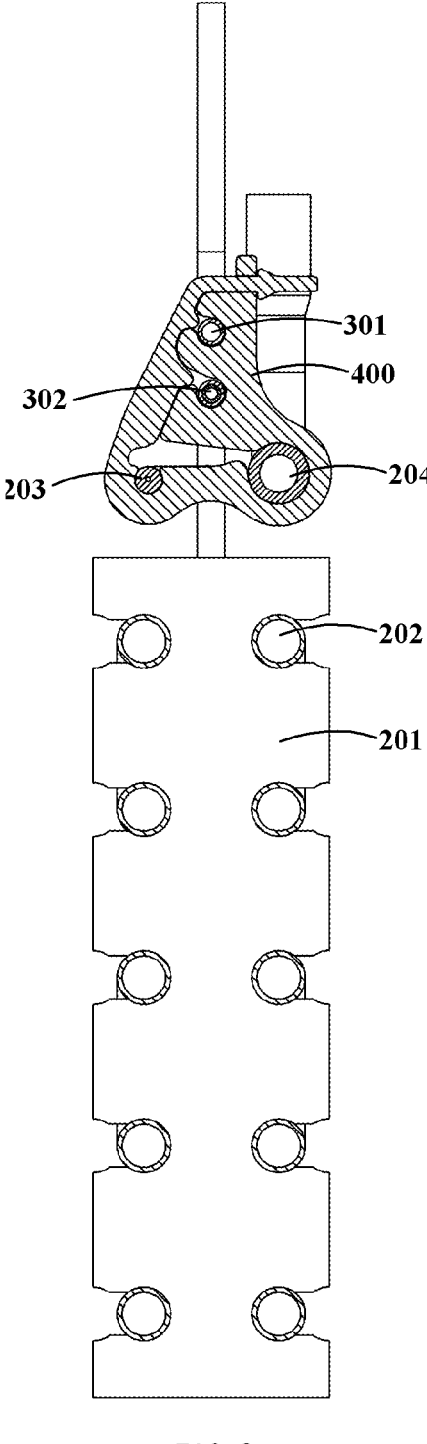
FIG. 2 is a sectional view of the evaporator shown in FIG. 1.
Figure 3:
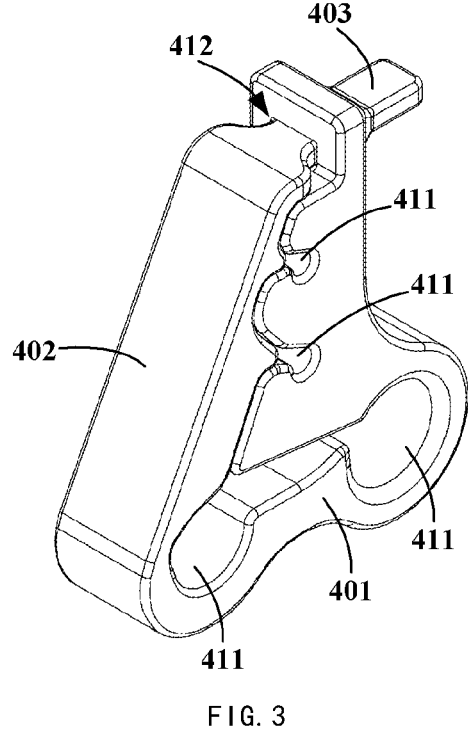
FIG. 3 is a structural schematic of an inter-pipe fixing member.

FIG. 1 illustrates the structure of an evaporator 200 with an inter-pipe fixing member 400 according to an embodiment of this invention. FIG. 2 is a sectional view of the evaporator 200 shown in FIG. 1. The inter-pipe fixing member 400 comprises a fixing portion 401 with at least two fixing grooves 411 configured to adapt to pipelines, and the at least two fixing grooves 411 are adapted to different pipelines and/or different sections of the same pipeline. This embodiment of the inter-pipe fixing member 400 comprises a fixing portion 401 having at least two fixing grooves 411, the at least two fixing grooves 411 are adapted to different pipelines and/or different sections of the same pipeline, thus ensuring the fixation between different pipelines and/or different sections of the same pipeline. When applied to the evaporator 200, it maintains a certain distance between the pipelines of the evaporator 200 without collisions. As shown in FIG. 3, a front wall of the fixing portion 401 has two fixing grooves 411 opening upwards and forwards, and the two fixing grooves 411 are spaced apart from each other along a vertical direction, to allow the pipeline to be threaded through the fixing grooves 411.

In some embodiments, the inter-pipe fixing member 400 further comprises a moving part 402 and an insertion part 403. The moving part 402 is movably connected to the fixing portion 401. The insertion part 403 is connecting with the moving part 402 and movably connected to the fixing portion 401, so that when the pipelines are inserted into the fixing grooves 411, pulling the insertion part 403 can bring the moving part 402 closer to the fixing portion 401, thereby securing the inter-pipe fixing member 400 with the pipelines. Specifically, the fixing portion 401 is further provided with an insertion port 412 into which the insertion part 403 is inserted. The part of the insertion part 403 that protrudes out of the insertion port 412 is further provided with an insertion protrusion 430 to further ensure the stable fixing of the inter-pipe fixing member 400 with the pipelines. As shown in FIG. 3, the fixing grooves 411 are opened in a left-and-right direction, and the insertion port 412 is opened in a front-and-back direction. In the application of this embodiment of the inter-pipe fixing member 400, the insertion part 403 can not be inserted into the insertion port 412, and the moving part 402 is far away from the fixing portion 401, and each pipeline is separately inserted into the corresponding fixing groove 411, then the moving part 402 is rotated to approach the fixing portion 401, and the insertion part 403 is inserted into the insertion port 412 and tightened to secure the inter-pipe fixing member 400 with the pipelines. Alternatively, the insertion part 403 can be initially inserted into the insertion port 412 but not tightened, and after each pipeline is inserted into its corresponding fixing groove 411, then tightened. This embodiment of the inter-pipe fixing member 400 comprises the fixing portion 401, the moving part 402, and the insertion part 403, and the inter-pipe fixing member 400 adopts a zip-tie-like fastening manner, thus ensuring the pipelines do not easily detach, maintaining the tightness and stability of the pipeline installation. The entire structure of the inter-pipe fixing member 400 is simple, easy to process and shape, and convenient for assembly with pipelines.

Furthermore, the size of each fixing groove 411 satisfies the requirement for an interference fit with the corresponding pipeline. For instance, an inner diameter of the fixing groove 411 is 0.1 mm smaller than an outer diameter of the corresponding pipeline, thereby ensuring a secure fit and preventing movement of the pipeline within the fixing groove 411.

Figure 5:
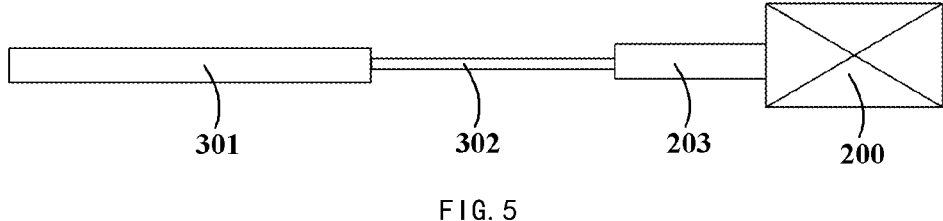
FIG. 5 is a structural schematic of a connecting pipeline and the evaporator as shown in FIG. 1.

As shown in FIG. 1, this embodiment of the evaporator 200 comprises an evaporator body, a connecting pipeline, and the inter-pipe fixing member 400. The evaporator body comprises multiple fins 201 and a coiled pipeline 202 bent and threaded through the multiple fins 201. The coiled pipeline 202 has a refrigerant inlet and a refrigerant outlet; the connecting pipeline is defined between a capillary tube and the refrigerant inlet. The aforementioned inter-pipe fixing member 400 is connected with the connecting pipeline via the fixing grooves 411, thereby reducing the noise caused by pipelines resonance during the operation of the evaporator 200. The connecting pipeline can be a conventional transition pipe or adopt the structure as shown in FIG. 5.

In some embodiments, the inter-pipe fixing member 400 can be an integrally formed flexible structure, or at least partially a flexible structure. The flexible part of the inter-pipe fixing member 400 can be the part of the inter-pipe fixing member 400 that contacts the pipelines, defined with a flexible structure. The material for the flexible structure of the inter-pipe fixing member 400 can be TPE, rubber, or silicone. For example, the inter-pipe fixing member 400 can be integrally formed using TPE material with a hardness of HS (A) 35-65. Each evaporator 200 is equipped with two inter-pipe fixing members 400.

Figure 4:
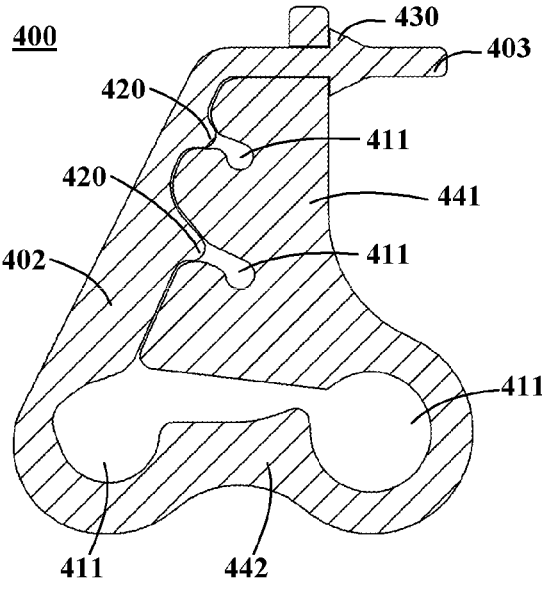
FIG. 4 is a sectional view of the inter-pipe fixing member.

FIG. 3 is a structural schematic of the inter-pipe fixing member 400. FIG. 4 is a sectional view of the inter-pipe fixing member 400. In some embodiments, the fixing portion 401 of the inter-pipe fixing member 400 comprises a first fixing section 441 and a second fixing section 442; the second fixing section 442 extends forward from the lower rear side of the first fixing section 441. The fixing grooves 411 are defined on the first fixing section 441, the second fixing section 442, or at an intersection between the first and second fixing sections 441, 442. An insertion port 412 is provided at an upper part of the first fixing section 441 of the inter-pipe fixing member 400; the moving part 402 is connected to a front end of the second fixing section 442, thereby allowing the pipeline to be inserted into the fixing groove 411, and then by rotating the moving part 402 upwards, the insertion part 403 is inserted into the insertion port 412.

As shown in FIGS. 3 and 4, a front wall of the first fixing section 441 is provided with at least two fixing grooves 411 opening upwards and forwards, and the at least two fixing grooves 411 are spaced apart from each other along the vertical direction. An upper wall of the second fixing section 442 is provided with one fixing groove 411 opening backwards and upwards. An intersection between the first fixing section 441 and the second fixing section 442 is provided with one fixing groove 411 opening upwards and forwards. By defining different orientations for the fixing grooves 411 at different positions, further assurance is provided for the fixation of the pipelines within the fixing grooves 411, and preventing the pipelines from detaching from the fixing grooves 411.

In some embodiments, the moving part 402 of the inter-pipe fixing member 400 has at least two docking protrusions 420 at the positions corresponding to the fixing grooves 411 on the front wall of the first fixing section 441, thus when the moving part 402 abuts against the fixing portion 401, the docking protrusions 420 are received in the relative fixing grooves 411, thereby securing the position of the pipelines within the fixing grooves 411.

Through the above innovative design, structurally, the inter-pipe fixing member 400 can tightly cooperate with each pipeline, thereby preventing loosening and displacement during the transportation and use of the refrigerator, and meeting the requirements for stability. About materiality, the inter-pipe fixing member 400 is resistant to high temperatures, low temperatures, corrosion, and aging, and is tough and not prone to breakage. In installation, the inter-pipe fixing member 400 is easy to install, thereby saving installation time and labor costs. In manufacturing, the inter-pipe fixing member 400 is easy to form and process, and the position of the fixing groove 411 is stable, thereby ensuring the pipeline does not easily detach and maintaining the stability of the pipeline gap. Additionally, all parts of the inter-pipe fixing member 400 in this embodiment are smooth without any special protrusions or grooves, thereby ensuring smooth and convenient installation. Furthermore, an entire outer contour of the inter-pipe fixing member 400 can be designed as a triangular structure composed of several smooth arcs, thereby making the entire inter-pipe fixing member 400 appear smooth and facilitating installation.

FIG. 5 is a structural schematic of the connecting pipeline and the evaporator 200 as shown in FIG. 1. As illustrated in FIG. 5, the connecting pipeline of the evaporator 200 in this embodiment comprises a first pipeline 301, a second pipeline 302, and an inlet pipeline 203 connected in sequence, the inlet pipeline 203 is connected to the refrigerant inlet, and an inner diameter of the first pipeline 301 is larger than that of the second pipeline 302. The refrigerant outlet of the evaporator 200 is connected to an outlet pipeline 204; the inter-pipe fixing member 400 is connected to at least two of the first pipeline 301, second pipeline 302, inlet pipeline 203, and outlet pipeline 204 via at least two fixing grooves 411, and each pipeline fits with the relative fixing groove 411 in an interference fit, thereby reducing the noise caused by pipelines resonance during the operation of the evaporator 200. By setting the inter-pipe fixing member 400, which is made of flexible material, the inter-pipe fixing member 400 is connecting with at least two of the first pipeline 301, second pipeline 302, inlet pipeline 203, and outlet pipeline 204 via at least two fixing grooves 411, thereby effectively reducing the noise caused by pipelines resonance during the operation of the evaporator 200. Due to the pipelines have a longer length, wrapping only one pipeline results in a higher modal frequency may make them prone to resonance.

Therefore, it is considered to set the inter-pipe fixing member 400 to constrain multiple cantilevered pipelines, thereby achieving better noise reduction. Specifically, during the operation of the evaporator 200, the flow of the refrigerant between the pipelines of the evaporator 200 causes strong vibration of the pipelines of the evaporator 200, thus generating significant noise. If the pipelines collide, it will exacerbate the noise and also affect the performance of the evaporator 200 and create safety hazards. The inter-pipe fixing member 400 acts as a clamp fixed between the relevant pipelines of the evaporator 200. By setting the inter-pipe fixing member 400, the relative positions of each pipeline of the evaporator 200 can be ensured, thereby preventing contact collisions, and reducing the noise during the operation of the evaporator 200 and enhancing safety performance.

In some embodiments of this invention, a length of the first pipeline 301 of the connecting pipeline is 0.02 m to 1.25 m, preferably 0.02 m to 0.9 m. Experimental tests have shown that when the length of the first pipeline 301 is between 0.02 m and 1.25 m, especially between 0.02 m and 0.9 m, it effectively reduces noise.

An upstream portion of the first pipeline 301 of the connecting pipeline in this embodiment is connected to a capillary tube (not shown); an inner diameter of the first pipeline 301 is 0.5-10 mm, and a wall thickness is 0.2-3 mm. The inner diameter of the first pipeline 301 is larger than that of the capillary tube. If the wall of the first pipeline 301 is too thin, the noise reduction effect is poor, but if the wall is too thick, it increases costs; if the inner diameter of the first pipeline 301 is too small, it might lead to other types of noise issues. Therefore, it is preferable to limit the inner diameter of the first pipeline 301 to 0.5-10 mm and the wall thickness to 0.2-3 mm.

Figure 6:
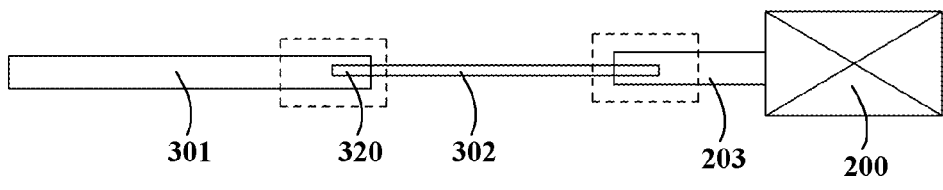
FIG. 6 is another structural schematic of the connecting pipeline and the evaporator as shown in FIG. 1.
Figure 7:
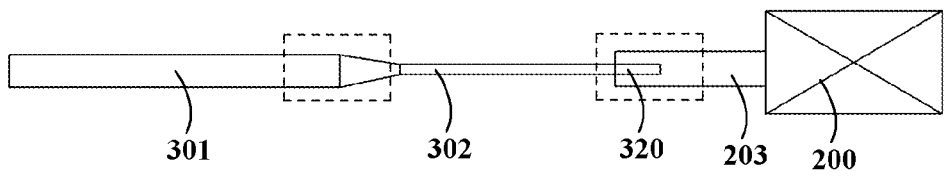
FIG. 7 is another structural schematic of the connecting pipeline and the evaporator as shown in FIG. 1.
Figure 8:
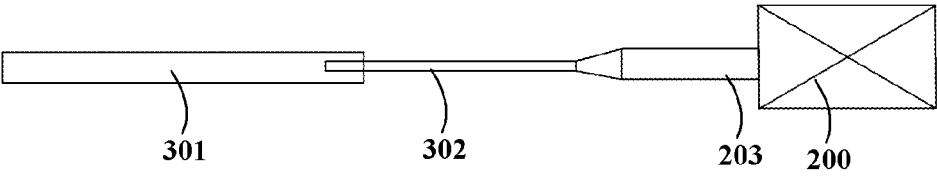
FIG. 8 is another structural schematic of the connecting pipeline and the evaporator as shown in FIG. 1.
Figure 9:
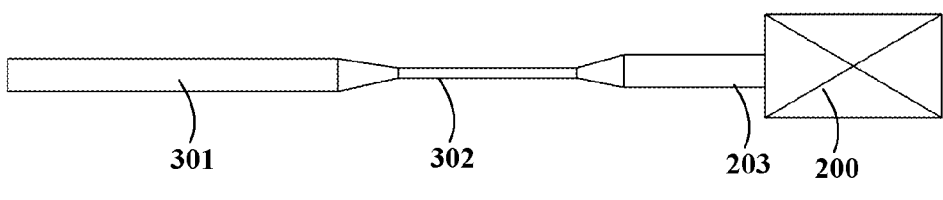
FIG. 9 is another structural schematic of the connecting pipeline and the evaporator as shown in FIG. 1.

In the process of resolving spray noise, the fixation technique between the first pipeline 301, the second pipeline 302, and the inlet pipeline 203 of the connecting pipeline in this embodiment is strongly related to the noise reduction effect. If not designed properly, it may lead to low-frequency noise problems. To ensure consistency in the process, the connecting pipeline of this embodiment optimizes the connection manner between every two neighboring pipelines. In some embodiments, the first pipeline 301 is fixed to the second pipeline 302 either by welding or by being integrally drawn; similarly, the second pipeline 302 is fixed to the inlet pipeline 203 either by welding or by being integrally drawn. FIG. 6 illustrates another structural schematic of the connecting pipeline and the evaporator 200 as shown in FIG. 1. In FIG. 6, the second pipeline 302 is welded to both the first pipeline 301 and the inlet pipeline 203. To ensure a certain strength of the welding, an inlet end of the second pipeline 302 is inserted into the first pipeline 301, and an outlet end of the second pipeline 302 is inserted into the inlet pipeline 203. In some embodiments, a length of insertion of the inlet end of the second pipeline 302 into the first pipeline 301 is 10-30 mm; similarly, a length of insertion of the outlet end of the second pipeline 302 into the inlet pipeline 203 is 10-30 mm. An insertion part 320 is marked in FIG. 6. FIG. 7 illustrates another structural schematic of the connecting pipeline and the evaporator 200 as shown in FIG. 1; FIG. 8 is another structural schematic of the connecting pipeline and the evaporator 200 as shown in FIG. 1; FIG. 9 is another structural schematic of the connecting pipeline and the evaporator 200 as shown in FIG. 1. In FIG. 7, the first pipeline 301 is fixed to the second pipeline 302 being integrally drawn, the second pipeline 302 is fixed to the inlet pipeline 203 by welding, the integrally drawing of the second pipeline 302 and the first pipeline 301 can reduce the fluid resistance of the refrigerant in the connection pipeline from coarse to fine, thus reducing the noise. In FIG. 8, the second pipeline 302 is welded to the first pipeline 301, while the second pipeline 302 and the inlet pipeline 203 are integrally drawn. The integral drawing of the second pipeline 302 with the inlet pipeline 203 reduces the fluid resistance when the refrigerant in the connecting pipeline transitions from coarse to fine, thereby reducing noise. In FIG. 9, the second pipeline 302 is integrally drawn with both the first pipeline 301 and the inlet pipeline 203.

The outlet pipeline 204 of the evaporator 200 in this embodiment is welded to a return pipe of the refrigerator (not shown), and the outlet pipeline 204 is threaded through one of the fixing grooves 411 of the inter-pipe fixing member 400. As shown in FIG. 1, each inter-pipe fixing member 400 is divided into three parts for modal constraints, constraining the upper, middle, and lower parts of the "S" shaped pipeline. After welding the outlet pipeline 204 to the return pipe of the refrigerator, the outlet pipeline 204 can be considered as a fixed constraint. By setting one of the fixing grooves 411 of the inter-pipe fixing member 400 to thread the outlet pipeline 204, the inter-pipe fixing member 400 can utilize the external force of the fixed outlet pipeline 204 to fix the thinner first pipeline 301 and the second pipeline 302, thereby suppressing the vertical vibration of the S-shaped connecting pipeline.

This embodiment of the inter-pipe fixing member 400 is set in the area 45-55 mm in front of and behind a diameter transition point between the first pipeline 301 and the second pipeline 302; and/or the inter-pipe fixing member 400 is set in the area 45-55 mm in front of and behind a diameter transition point between the second pipeline 302 and the inlet pipeline 203. The locations suitable for installing the inter-pipe fixing member 400 are indicated with square brackets in FIGS. 6 and 7. The choice of different positions for the inter-pipe fixing member 400 is crucial. The right position segment can effectively suppress pipeline vibration and change the pipeline mode, avoiding resonance. If the inter-pipe fixing member 400 is placed at the modal node position, it will have no effect, and if placed at some other positions, the vibration might be amplified. When the refrigerant in the pipelines of the evaporator 200 flows from the first pipeline 301 to the second pipeline 302, throttling occurs at the diameter transition point due to increased resistance, causing intense fluid vibration. Adding the inter-pipe fixing member 400 at this position segment has a good damping effect. When the refrigerant flows from the second pipeline 302 to the inlet pipeline 203, a spray phenomenon occurs at the diameter transition point, where the vibration is most intense, and adding the inter-pipe fixing member 400 in this position segment will have a good damping effect.

This embodiment of the invention further provides a refrigerator having the aforementioned evaporator 200. The refrigerator of this embodiment includes a cabinet, a door (not shown), and a compression refrigeration system. An inner liner of the cabinet defines storage compartments. Depending on the preservation temperature, the storage compartments can be divided into refrigeration compartments, freezer compartments, and variable temperature compartments, among others. The compression refrigeration system includes a compressor, the aforementioned evaporator 200, a condenser, and a capillary tube, among others. The evaporator 200 is used to provide cooling for the storage compartments.

In the description of this embodiment, it should be understood that the terms "up," "down," "front," "back," "left,"

"right," and similar directional or positional terms are based on the orientations or positions shown in the drawings. They are used only to facilitate the description of the invention and to simplify the explanation, rather than to indicate or imply that the apparatus or components must have a specific orientation, be constructed and operated in a specific orientation, and thus should not be construed as limiting the invention.

The terms "first," "second," etc., are used only for descriptive purposes and should not be interpreted as indicating or implying relative importance or implicitly specifying the number of technical features indicated. Therefore, features labeled "first," "second," etc., can explicitly or implicitly include one or more of such features.

It should be noted that if the embodiment of the invention involves directional indications (such as up, down, left, right, front, back), these indications are only used to explain the relative position relationships, motion situations, etc., of the components in a certain posture (as shown in the drawings). If this specific posture changes, then the directional indications will accordingly change.

So far, it should be appreciated by those skilled in the art that while various exemplary embodiments of the invention have been shown and described in detail herein, many other variations or modifications which are consistent with the principles of this invention may be determined or derived directly from the disclosure of the present invention without departing from the spirit and scope of the invention. Accordingly, the scope of the invention should be understood and interpreted to cover all such other variations or modifications.

What is claimed is:

1. An inter-pipe fixing member, comprising:
a fixing portion defining at least two fixing grooves, wherein the fixing grooves are configured to adapt to pipelines, and the at least two fixing grooves are adapted to different pipelines, and/or the at least two fixing grooves are adapted to different sections of the same pipeline;
a moving part, movably connected to the fixing portion; and
an insertion part;
wherein the insertion part is connecting with the moving part in an inseparable relationship and detachably connected to the fixing portion, such that the pipeline inserted into the fixing groove, and pulling the insertion part brings the moving part closer to the fixing portion to secure the inter-pipe fixing member with the pipeline,
wherein the fixing portion comprises a first fixing section and a second fixing section; the second fixing section extends forward from a lower rear side of the first fixing section; the fixing grooves are defined on the first fixing section, the second fixing section, or at an intersection between the first and second fixing sections, and
wherein a front wall of the first fixing section is provided with at least two fixing grooves opening upwards and forwards at intervals along a vertical direction; an upper wall of the second fixing section is provided with a fixing groove opening backwards and upwards; the intersection between the first and second fixing sections is provided with a fixing groove opening upwards and forwards.

2. The inter-pipe fixing member according to claim 1, wherein the inter-pipe fixing member is an integrally formed flexible structure, or at least partially a flexible structure.

3. The inter-pipe fixing member according to claim 1, wherein the fixing portion is provided with an insertion port, into which the insertion part is inserted; a part of the insertion part protruding out of the insertion port is further provided with an insertion protrusion.

4. The inter-pipe fixing member according to claim 1, wherein the moving part above the fixing groove on the front wall of the first fixing section is formed with a docking protrusion, ensuring that when the moving part fits against the fixing portion, the docking protrusion cooperates inside the fixing groove.

5. An evaporator, comprising: an evaporator body, with a coiled pipeline having a refrigerant inlet and a refrigerant outlet; a connecting pipeline defined between a capillary tube and the refrigerant inlet; and the inter-pipe fixing member according to claim 1, connected with the connecting pipeline via the fixing grooves, to reduce the noise caused by pipelines resonance during the operation of the evaporator.

6. The evaporator according to claim 5, wherein the refrigerant outlet is connected to an outlet pipeline; the connecting pipeline comprises a first pipeline, a second pipeline, and an inlet pipeline connected in sequence, the inlet pipeline is connected to the refrigerant inlet, and an inner diameter of the first pipeline is larger than that of the second pipeline; the inter-pipe fixing member is connected with at least two of the first pipeline, second pipeline, inlet pipeline, and outlet pipeline via at least two fixing grooves, and the pipelines fit with the fixing grooves in an interference fit.

7. A refrigerator, having the evaporator according to claim 5.

\*  \*  \*  \*  \*